US012040551B2

(12) United States Patent
Rogers

(10) Patent No.: US 12,040,551 B2
(45) Date of Patent: Jul. 16, 2024

(54) PNEUMATICALLY DRIVEN STEERABLE ANTENNA ARRAY

(71) Applicant: The Boeing Company, Chicago, IL (US)

(72) Inventor: John E. Rogers, Owen Cross Roads, AL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/149,747

(22) Filed: Jan. 4, 2023

(65) Prior Publication Data

US 2023/0155282 A1 May 18, 2023

Related U.S. Application Data

(62) Division of application No. 16/732,483, filed on Jan. 2, 2020, now Pat. No. 11,569,573.

(51) Int. Cl.
*H01Q 3/02* (2006.01)
*H01Q 3/32* (2006.01)
(Continued)

(52) U.S. Cl.
CPC ................. *H01Q 3/02* (2013.01); *H01Q 3/32* (2013.01); *H01Q 3/44* (2013.01); *H01Q 13/206* (2013.01); *H01Q 9/0457* (2013.01)

(58) Field of Classification Search
CPC .. H01Q 3/02; H01Q 3/32; H01Q 3/44; H01Q 9/0457; H01Q 13/206
See application file for complete search history.

(56) References Cited

U.S. PATENT DOCUMENTS 6,927,745 B2 8/2005 Brown et al.
9,960,493 B2 5/2018 Luk et al.
(Continued)

FOREIGN PATENT DOCUMENTS

CN 106910993 A 6/2017

OTHER PUBLICATIONS

Al-Charchafchi, S. H., et al., "Electronically tunable microstrip patch antennas," IEEE Antennas and Propagation Society International Symposium, Jun. 1998.
(Continued)

*Primary Examiner* — Hoang V Nguyen
*Assistant Examiner* — Amal Patel
(74) *Attorney, Agent, or Firm* — McDonnell Boehnen Hulbert & Berghoff LLP

(57) ABSTRACT

Methods and systems for a steerable antenna array are disclosed. The antenna array includes an array of antenna elements aligned in rows and columns on a substrate. Additionally, the antenna array includes a microstrip feed within the substrate, where the feed is configured to electromagnetically couple to each antenna element of the array of antenna elements. The antenna array further includes a ground plane within the substrate. Additionally, for each antenna element, the antenna array includes a first cavity disposed between the ground plane and feed, and a second cavity disposed on the other side of the ground plane from the first cavity. The antenna array further includes a plurality of fluid lines configured to selectively add or remove fluid from the cavities coupled to the fluid line and cause a deflection of the ground plane in a region of the cavities coupled to the fluid line.

20 Claims, 7 Drawing Sheets

(51) Int. Cl.

| | |
|---|---|
| ***H01Q 3/44*** | (2006.01) |
| ***H01Q 9/04*** | (2006.01) |
| ***H01Q 13/20*** | (2006.01) |

(56) References Cited

U.S. PATENT DOCUMENTS

| | | | | |
|---|---|---|---|---|
| 2005/0017905 | A1* | 1/2005 | Rawnick | H01Q 1/48<br>343/700 MS |
| 2019/0131719 | A1* | 5/2019 | Haziza | H01Q 21/0037 |
| 2021/0210849 | A1 | 7/2021 | Rogers | |

OTHER PUBLICATIONS

Varadan, V. K., et al., "Design and development of electronically tunable microstrip antennas," Smart Materials and Structures, Feb. 1999.

Yang, S. L. S., et al., "Frequency reconfigurable u-slot microstrip patch antenna," IEEE Antennas and Wireless Propagation Letters, vol. 7, Jan. 2008.

Sheta, A. F., Mahmoud, S. F., "A widely tunable compact patch antenna," IEEE Antennas and Wireless Propagation Letters, vol. 7, Jan. 2008.

Liu, L., Langley, R. J., "Liquid crystal tunable microstrip patch antenna," Electronics Letters, vol. 44, No. 20, Sep. 2008.

Karabey, O. H., et al., "A 2-D electronically steered phased-array antenna with 2×2 elements in LC display technology," IEEE Transactions on Microwave Theory and Techniques, vol. 60, No. 5, May 2012.

* cited by examiner

PNEUMATICALLY DRIVEN STEERABLE ANTENNA ARRAY

REFERENCE TO RELATED APPLICATION

The present disclosure claims priority to and is a divisional of U.S. application Ser. No. 16/732,483, filed on Jan. 2, 2020, the entire contents of which are herein incorporated by reference.

FIELD

The subject disclosure relates generally to an antenna system for example an antenna system that comprises a pneumatically driven steerable antenna array. In further examples, the antenna system can be used as a part of a radar system.

BACKGROUND

Radio detection and ranging (or radar) systems can be used to actively estimate parameters of environmental features by emitting radio signals and detecting returning reflected signals. Radar systems can determine the distance to radio-reflective features according to a time delay between transmission and reception of signals. Radar systems use antennas to emit a radio signal that varies in frequency over time, such as a signal with a time-varying frequency ramp (or chirp), and then based on the difference in frequency between the emitted signal and the reflected signal estimate range. Some systems may also estimate the relative motion of objects causing radar reflections based on Doppler frequency shifts in the received reflected signals.

The antennas of a radar system may be an array of antennas. An array may be an arrangement of antennas that have a physical layout that produces desirable antenna properties. For example, antennas may be arranged in a linear array with all the antennas aligned on a line, a two dimensional array with all the antennas aligned on a plane, or other possible antenna array arrangements as well.

Commonly, the antenna arrays of the radar system may be mounted on an aircraft or ground station. Antennas mounted on aircraft typically radiate signals away from the aircraft. Generally, arrays are designed to radiate in a desired direction away from the aircraft with high gain (or directivity) and low beamwidth.

Additionally, in some arrays, a direction of the beam may be steered. To accomplish beam steering, the various antenna elements of the array may be fed with electromagnetic signals that have different respective phasing. By controlling the phasing, a direction of the beam may be controlled. However, controlling the phasing of the antenna elements in active electronically steerable antennas (or AESAs) requires significant power as each antenna element typically has its own amplifier and phase shifting element. Furthermore, AESAs are cost prohibitive for many applications.

SUMMARY

The subject disclosure is designed to address at least one of the aforementioned problems and/or meet at least one of the aforementioned needs. By designing an array that has a steerable beam, without the need for additional expensive electronics, an antenna system may be created that has the benefits of ease of manufacturing, while removing the cost associated with phase shifting on an per-antenna basis.

In one example, the subject disclosure is directed toward an antenna array. The antenna array includes an array of antenna elements on a substrate. The array includes antennas aligned in rows and columns, where each row comprises at least two antennas and each column comprises at least one antenna. Additionally, the antenna array includes a microstrip feed within the substrate, where the feed is configured to electromagnetically couple to each antenna element of the array of antenna elements. The antenna array further includes a ground plane within the substrate. Additionally, for each antenna element and located below the respective antenna element within the substrate, the antenna array includes a first cavity disposed between the ground plane and feed, and a second cavity disposed on the other side of the ground plane from the first cavity. The antenna array further includes a plurality of fluid lines, where there is one respective fluid line for each column and the respective fluid line is coupled to one of the first cavities and the second cavities of the column. Moreover, at least one fluid line is configured to selectively add or remove fluid from the cavities coupled to the fluid line and cause a deflection of the ground plane in a region of the cavities coupled to the fluid line.

In still another example, a method of manufacturing an antenna array is described. The method includes disposing at least two antenna elements on a top surface of a first substrate. The method further includes disposing a microstrip feed on a bottom surface of a second substrate. Additionally, the method includes forming at least one first cavity in a third substrate. The method also includes disposing a ground plane on a bottom surface of a fourth substrate, forming a fourth layer. Yet further, the method includes forming at least one second cavity in a fifth substrate with a rigid boundary provided by a sixth substrate. Moreover, the method includes coupling a bottom surface of the first substrate to a top surface of the second substrate, the bottom surface of the second substrate to a top surface of the third substrate, a bottom surface of the third substrate to a top surface of the fourth substrate, a bottom surface of the fourth layer to a top surface of the fifth substrate, and a bottom surface of the fifth substrate to a top surface of the sixth substrate.

In still another example, a method of operating an antenna array is described. The method includes determining a desired beam tilt for an antenna array. The method also includes providing a fluid to at least one cavity associated with each antenna of the antenna array, where each antenna has a first associated cavity and a second associated cavity. As part of the method, the fluid is provided to cause a deflection of a ground plane located between the first cavity and the second cavity and the deflection causes a beam tilt in a first direction for the antenna array. Additionally, the method includes coupling signals between an antenna feed and each antenna of the antenna array by a microstrip feed.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the subject disclosure when read in conjunction with the accompanying drawings.

DETAILED DESCRIPTION

Figure 1:
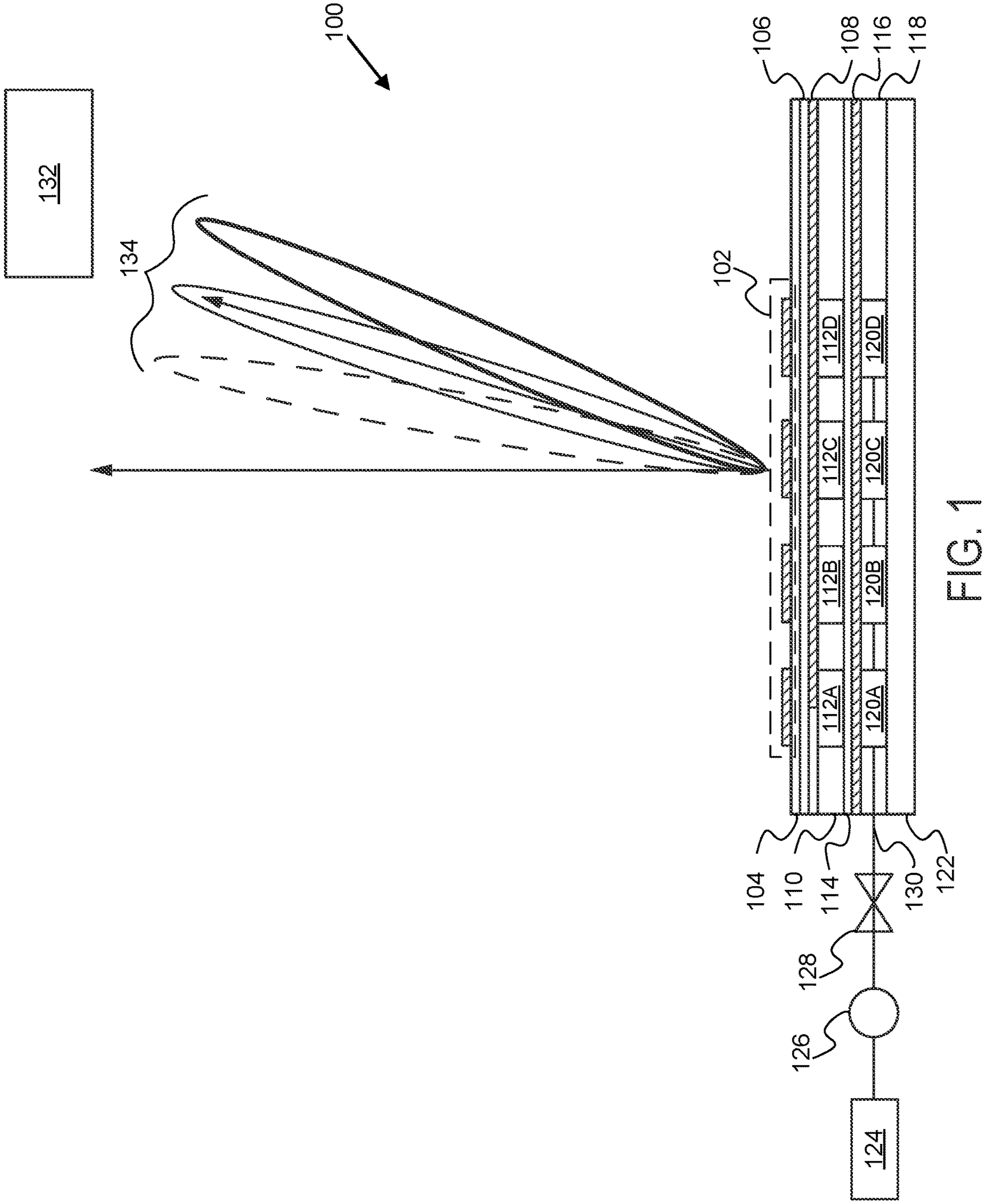
FIG. 1 is a diagrammatic representation of an example antenna array.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Examples, systems and methods for an antenna array are described. In some examples, the disclosed antenna array can be used as part of a radar system. The disclosed antenna array uses substrate-mounted antennas to form an antenna array. The antennas can be fed by a metallic feed structure located in the substrate. Unlike conventional phased arrays that have per-element transmitters, all the antennas of the disclosed array are fed by one common feed. However, the subject disclosure enables an array to have beam steering properties despite the common feed. By having cavities located within the substrate below each antenna, fluid can be added or removed from the cavity. When fluid is added or removed from the cavity, a ground plane that borders the cavity can be deflected either upwards or downwards. This deflection of the ground plane can cause the respective antenna located above the cavity to have a phase shift due to a change in capacitance of the antenna caused by the ground plane's deflection. By controlling a relative phase shift between antenna elements of the array, a beam of the antenna can be steered.

Because antennas are reciprocal elements, an antenna that radiates a signal in a given direction also can receive signals in the given direction. Therefore, when the term radiating is used in the subject disclosure, it should be readily understood that it applies equally to antennas transmitting signals as well as receiving signals. Thus, the disclosed beam steering can be used to steer a beam for transmitting signals and/or receiving signals.

The disclosed array can be operable across a wide range of frequencies. Depending on the desired frequencies of operation, the various elements can be adjusted in size. In various examples, the frequencies of operation can be various frequencies associated with radar systems. However, the disclosed array can also be used with cellular frequencies and/or wi-fi frequencies. Additionally, the number of elements in the array can vary depending on the embodiment. In one example, the array can contain two elements. In other examples, the array can contain more than two elements, even hundreds or thousands of elements. Based on a specific use case and desired radiation characteristics, different numbers of antennas can be used.

By using the techniques, methods, and devices of the subject disclosure, a steerable antenna array that uses a small number of electrical components can be manufactured and operated. Additionally, the array can also be relatively low cost to manufacture, as complex phase-shift electronics or individual transmitters are not required for beam steering.

Referring now to the figures, FIG. 1 is a diagrammatic representation of an antenna array 100. The antenna array 100 includes a plurality of antenna elements aligned in an array 102. The plurality of antenna elements aligned in an array 102 are mounted on a top side of a first layer 104 of a substrate. A second layer 106 of the substrate has a microstrip feed 108 located on a bottom surface of the second layer 106. A third layer 110 of the substrate includes a plurality of cavities 112A-112D. A fourth layer 114 of the substrate has a ground plane 116 located on the bottom side of the fourth layer 114. A fifth layer 118 of the substrate includes a plurality of cavities 120A-120D. A sixth layer 122 of the substrate functions to provide a rigid boundary for the plurality of cavities 120A-120D of the antenna array 100. The six layers shown in FIG. 1 can be referred to as a single substrate when they are formed together. However, each layer can also be referred to as a substrate individually. Further, in various examples, the layers and their components can be arranged in a different order and/or have different locations. The arrangement shown in FIG. 1 is one example. For example, in some embodiments, the second layer 106 can be omitted and the microstrip feed can be located on the bottom of the first layer 104 or on the top of the third layer 110.

Additionally, the antenna array 100 includes a controller 124 connected to a plurality of pumps 126. The plurality of pumps 126 are coupled to one or more switches 128. An output of each switch of the one or more switches 128 is connected to one or more fluid lines 130. The one or more fluid lines 130 are coupled to one of the sets of cavities, shown as coupled to the plurality of cavities 120A-120D in FIG. 1.

In one example, the antenna array 100 operates as a radar antenna. The antenna array 100 has a target object 132 which the antenna array 100 can image with a radar signal. To image the target object 132, the antenna array 100 transmits a steerable beam 134. The antenna array 100 can also receive radar reflections from the target object 132 along the direction of the steerable beam 134.

The plurality of antenna elements aligned in an array 102 can have different alignments and configurations in different examples. At a minimum, the array 102 contains at least two antenna elements. Additionally, the array 102 includes antennas aligned in rows and columns. Each row contains at least two antennas and each column includes at least one antenna. The four antennas shown in array 102 form four antennas in one column (or a 1×4 array). Array 102 also includes more antenna elements, in rows, but they are not shown in FIG. 1, as FIG. 1 is shown from a side view and the other antennas are located behind those forming array 102.

The microstrip feed 108 is configured to electromagnetically couple to each antenna element of the array of antenna elements. The microstrip feed 108 can have a single port (shown in FIGS. 2 and 3), configured to couple in signals for transmission by the array 102 or couple out signals received by the array 102.

When the antenna array 100 is configured to transmit, the microstrip feed 108 receives a signal at a port and electromagnetically couples to each antenna of array 102. The electromagnetic coupling causes the array 102 to radiate a signal.

When the antenna array 100 is configured to receive, the array 102 receives a signal that is electromagnetically coupled to the microstrip feed 108. The signal electromagnetically coupled to the microstrip feed 108 can be output by the port. The port can be coupled to radio and/or radar hardware that can perform signal processing and/or signal generation.

During the operation of the antenna, the controller 124 can determine that the beam transmitted by the array should be steered to a different direction. In some examples, a processor of the controller 124 can be configured to scan the steerable beam 134 throughout a given region in a predetermined pattern. In another example, the processor of the controller 124 can be configured to scan the steerable beam 134 based on a location of a target object 132.

To steer the steerable beam 134, the processor of the controller 124 can cause the plurality of pumps 126 to add or remove fluid from the cavities of the substrate. Example fluids may include liquids and gasses. In some examples, the liquids may include liquids that do not conduct electricity and gasses may include air or a purified gas, such as nitrogen. The controller 124 can be able to switch the plurality of pumps on or off or change a rate or a direction at which the pump operates. The controller 124 can also be configured to selectively enable or disable one or more switches 128 to add or remove fluid from the cavities.

To add or remove fluid from the cavities, an output of each switch of the one or more switches 128 is connected to one or more fluid lines 130. The one or more fluid lines 130 are coupled to one of the sets of cavities, such as the plurality of cavities 120A-120D shown in FIG. 1. In some examples, the one or more fluid lines 130 are coupled to the other set of cavities 112A-112D. In yet other examples, different fluid lines can be coupled to cavities 112A-112D and cavities 120A-120D. The fluid lines allow the flow of fluid, such as a liquid or a gas from the cavities. This can pressurize or depressurize the cavities and cause a deflection of the ground plane 116.

Figure 2A:
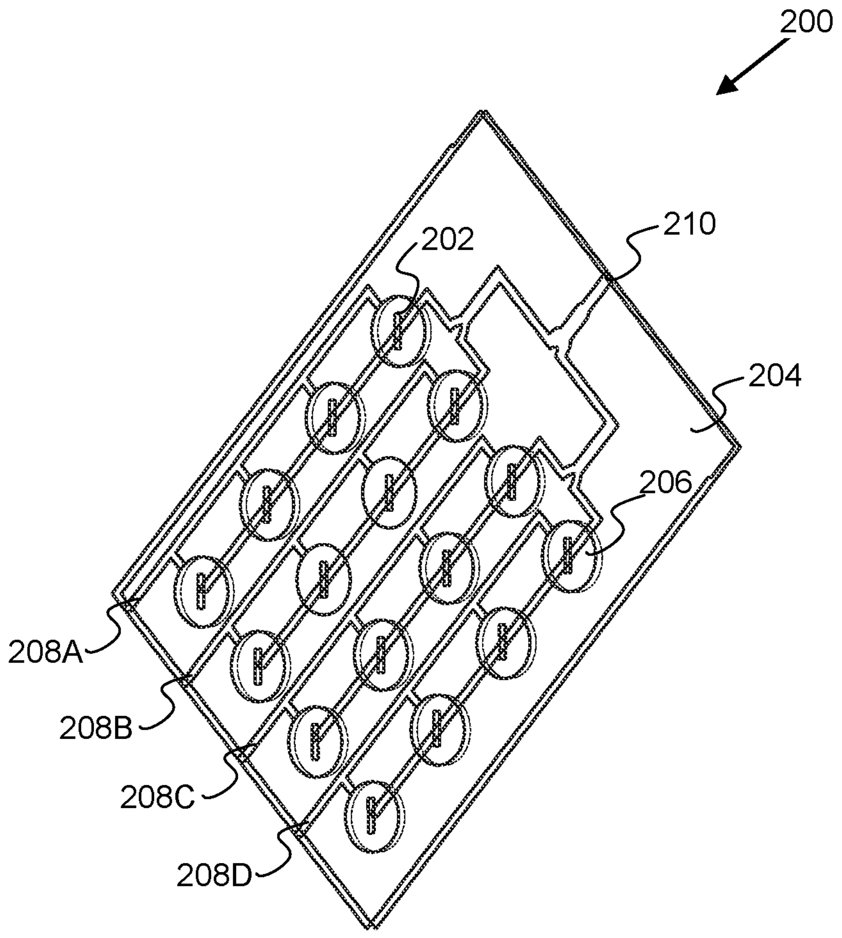
FIG. 2A is an isometric view of an example antenna array.
Figure 2B:
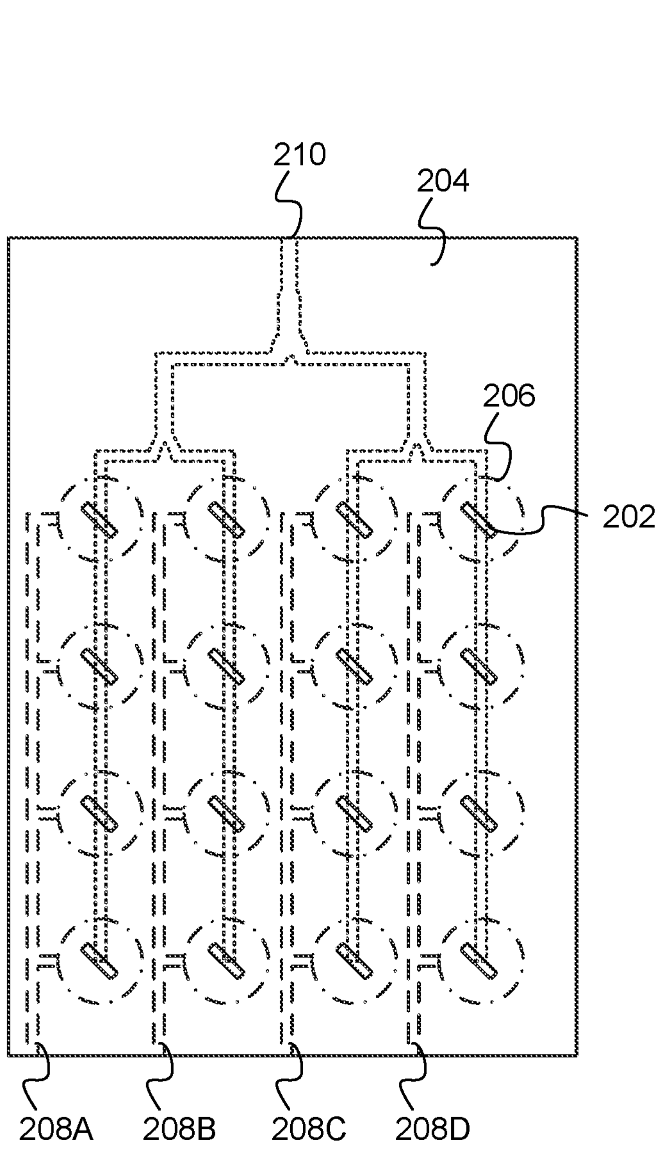
FIG. 2B is a top-down view of an example antenna array.

FIG. 2A is an isometric view of an example antenna array 200 and FIG. 2B is a top-down view of the example antenna array 200. Antenna array 200 can include similar components to those described with respect to FIG. 1. Additionally, the components of antenna array 200 can function in a similar manner to those described with respect to FIG. 1. The antenna array 200 is configured to be able to tilt the antenna beam in one plane (e.g., left and right with respect to FIG. 1).

The antenna array 200 includes a plurality of antenna elements, one of which is labeled as antenna element 202. The antenna elements are arranged in a two dimensional array on a top surface of a substrate 204. The plurality of antenna elements are shown as circular antenna elements with inclusive slots. However, different shapes of antennas can be used as well, in different examples. Additionally, the substrate 204 can include many different layers, such as the layers described with respect to FIG. 1. Moreover, the number of antenna elements in the array can be varied, in different examples. In one example, the array can contain only two elements. The two elements can form two columns, each column having a respective fluid line. In other examples, more elements can be used, with each column having a respective fluid line.

Each antenna of the plurality of antennas can be located on the substrate 204 at a location which is located above a respective cavity, of which one is labeled as cavity 206. Each cavity can be two separate cavities located on top of each other, separated by a ground plane (shown in FIG. 1). Additionally, the cavities are shown as being circular, however, other shapes for the cavities are possible as well.

The antenna array 200 also includes a plurality of fluid lines, shown as first fluid line 208A, second fluid line 208B, third fluid line 208C, and fourth fluid line 208D. Each fluid line is coupled to a respective switch, as shown in FIG. 1. Further, each switch can be coupled to a respective pump. In some examples, one pump is coupled to all the switches. Generally, both fluid lines will be filled with the same fluid. However, in some examples, different fluids may be used in the first and second fluid lines.

Each of the fluid lines is configured to supply or remove fluid from the cavities of the column to which the fluid line is coupled. By adding or removing fluid, the pressure within the cavities of column can be increased or reduced. This change in pressure can cause a deflection of the ground plane in the region of the cavities having the pressure change. This ground plane deflection causes a change in capacitance of the antennas located above the cavities. When the capacitance of the antennas change, the phase of the signal radiated by the antenna has a phase shift compared to the antennas without the change in capacitance.

As shown in FIG. 1, each antenna can have a plurality of cavities 112A-112D located above the ground plane and can have a plurality of cavities 120A-120D located below the ground plane. The fluid lines of FIGS. 2A and 2B, can be coupled to either the top set of cavities, the plurality of cavities 112A-112D, or the bottom set of cavities, the plurality of cavities 120A-120D.

Additionally, the antenna array 200 has a feed 210. The feed allows signals to be electromagnetically coupled into the antenna array 200 and coupled out from the antenna array 200. During the transmission of signals, a signal from a radar processor (not shown) is fed to the input of the feed 210. The feed then splits the signal between the different rows of antenna elements of the antenna array 200. In some examples, the power division is performed equally so each column receives the same amount of power. The feed also couples power to each individual antenna element. The antenna elements, in turn, radiate signals based on the power received from the feed.

During the reception of signals, the antenna array 200 receives signals. The signals can be received by all or a subset of the antenna elements. The received signals are electromagnetically coupled to the feed line below each antenna element. The power from the received signals is combined within the lines of the feed 210. The combined signals can be output to the radar processor (not shown) by the input of the feed 210.

In practice, during the operation of the antenna array 200, a controller, such as that described with respect to FIG. 1, can determine a desired direction in which to steer the beam transmitted by the antenna array 200. In one example, it can be determined that the antenna array should transmit the beam in a broadside direction, that is orthogonal to the plane of the antenna array 200. When transmitting a broadside beam, the phase of the signal transmitted by each antenna element should be the same as the phase from each other antenna element. Therefore, the controller cannot cause the deflection of the ground planes of the antenna array and not add or remove fluid from the cavities.

In other examples, when a tilt of the beam is desired, the controller can determine how much fluid to add or remove from each respective column of the array. When the beam is tilted, the controller can add or remove fluid from each column to cause a respective phase shift of the antenna elements in each column. In some examples, the phase shift can be linearly applied. In one example of a linearly applied phase shift, the first column supplied by the first fluid line 208A may have no fluid added or removed, thus, the respective phase shift can be zero. The second column supplied by the second fluid line 208B can have fluid added or removed to cause a first phase shift of X (degrees or radians). The third column supplied by the third fluid line 208C can have fluid added or removed to cause a second phase shift of 2X (degrees or radians). The fourth column supplied by the fourth fluid line 208D can have fluid added or removed to cause a third phase shift of 3X (degrees or radians). Thus, the phase shift can be made to increase by the same amount between the phase shifted lines. This phase shift will cause a tilt of the beam of the antenna array in a direction left or right on FIG. 2 (i.e., in a direction with respect to the orientation of the columns).

In other examples, the phase shifts can be applied differently, such as in a non-linear manner, or with different relative phases.

Figure 3:
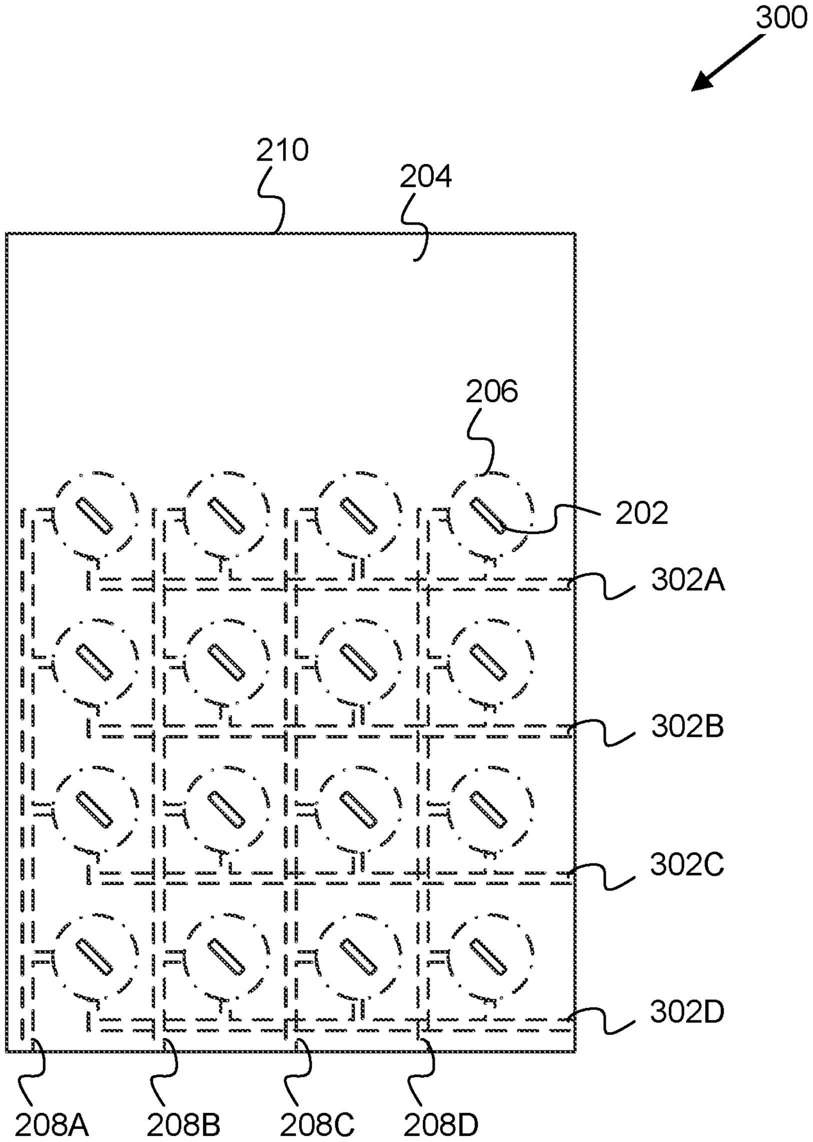
FIG. 3 is a top-down view of another example antenna array.

FIG. 3 is a top-down view of another example antenna array 300. The antenna array 300 can be similar to the antenna array 200, but with another set of fluid lines configured to supply fluid to the cavities arranged in rows. The antenna array 300 is configured to be able to tilt the antenna beam in two planes (i.e., left and right with respect to the figure and also up and down with respect to the figure). By adding or removing fluid from the first set of fluid lines (e.g., fluid lines 208A-208D) the beam can be tilted to the left or right and by adding or removing fluid from the second set of fluid lines (e.g., fluid lines 302A-302D) the beam can be tilted up or down.

As shown in FIG. 1, each antenna can have a plurality of cavities 112A-112D located above the ground plane and can have a plurality of cavities 120A-120D located below the ground plane. The first set of fluid lines (e.g., fluid lines 208A-208D) of FIG. 3, can be coupled to either the top set of cavities, the plurality of cavities 112A-112D, or the bottom set of cavities, the plurality of cavities 120A-120D. The second set of fluid lines (e.g., fluid lines 302A-302D) of FIG. 3, can be coupled to the other set of cavities from those to which the first set of fluid lines are coupled. For example, if the first set of fluid lines are coupled to the top cavity, the second set of fluid lines are coupled to the bottom cavity. Conversely, if the first set of fluid lines are coupled to the bottom cavity, the second set of fluid lines are coupled to the top cavity.

Thus, the antenna array 300 can be able to add or remove fluid from both cavities of each antenna. By having two degrees of freedom (e.g., supplying fluid to the cavities and the rows independently) the beam can be tilted along both planes. Thus, the beam can be tilted both left and right as well as up and down.

Figure 4:
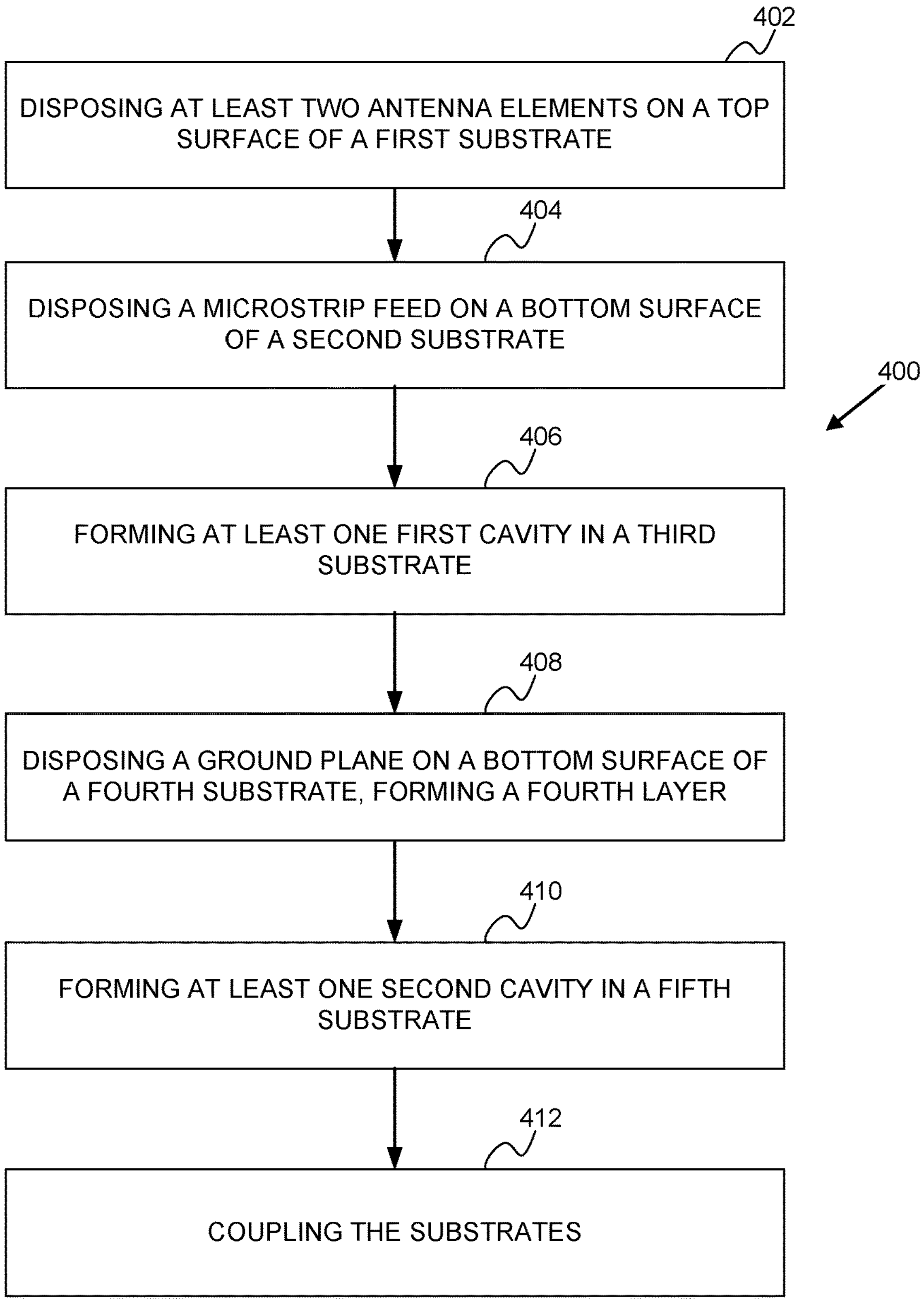
FIG. 4 is a diagrammatic representation of an example method for forming the antenna arrays disclosed herein.

FIG. 4 is a diagrammatic representation of an example method 400 for forming the antenna arrays disclosed herein. At block 402, the method 400 includes disposing at least two antenna elements on a top surface of a first substrate. The elements can be patch or slot antennas. The antennas are formed as metallic structures on the top surface of the first substrate. The antennas can be arranged in a two-dimensional arraying having equal spacing between antenna elements. Further, the two-dimensional array has antennas aligned in rows along one dimension and columns along another dimension.

At block 404, the method 400 includes disposing a microstrip feed on a bottom surface of a second substrate. The microstrip feed can be a metallic trace configured to couple electromagnetic signals to and from the antenna elements. The microstrip feed also can perform power-splitting and power-combining functions. In some examples, the microstrip feed can have a single input/output port by which signals are coupled to the antenna array for transmission and received signals are removed from the antenna array.

However, in some other examples, the microstrip feed can be a plurality of different feeds. In this example, each respective feed can have an input/output port by which signals are coupled to the antenna array for transmission and received signals are removed from the antenna array. Also, in this example, each microstrip feed can be configured to supply or receive signals from a given column or row of the antenna array.

Additionally, in some examples, rather than the microstrip feed being coupled to the bottom surface of a second substrate, the microstrip feed can be coupled to the bottom surface of the first substrate (i.e., on the side of the first substrate opposite the antennas) and the second substrate can be omitted.

At block 406, the method 400 includes forming at least one first cavity in a third substrate. The at least one first cavity can be formed in the third substrate by various means in different embodiments. In some embodiments, the at least one first cavity can be formed through a chemical process, such as wet etching. In other embodiments, the at least one first cavity can be formed through physical processes, such as laser ablation or machining. Additionally, at block 406, the at least one first cavity is formed so there is one cavity of the first cavities corresponding to each antenna of the antenna array. The at least one first cavity can be located at a position on the third substrate corresponding to the location of the antenna on the first substrate. Each antenna can be located in a position corresponding to the center of a given cavity of the at least one first cavity in a direction perpendicular to the plane of the antennas.

Additionally, in some examples, block 406 can include forming fluid lines in the third substrate. The fluid lines can correspond to a respective fluid line for each one of the rows or columns of antennas located on the first layer. The fluid lines can be configured to add or remove fluid from the at least one first cavity as previously discussed.

At block 408, the method 400 includes disposing a ground plane on a bottom surface of a fourth substrate, forming a fourth layer. The ground plane can be a metallic layer that functions as a ground plane for the antennas located on the first layer. In some examples, the fourth substrate can be omitted and a metallic ground plane can be a sheet of metal without a corresponding substrate. The fourth layer can be somewhat flexible. The flexibility of the fourth layer enables the ground plane to be deflected based on the pressure within the cavities, as described throughout.

At block 410, the method 400 includes forming at least one second cavity in a fifth substrate. The at least one second cavity can be formed in the fifth substrate by various means in different embodiments. In some embodiments, the at least one second cavity can be formed through a chemical process, such as wet etching. In other embodiments, the at least one second cavity can be formed through physical processes, such as laser ablation or machining. Additionally, at block 410, the at least one second cavity is formed so there is one cavity of the second cavities corresponding to each antenna of the antenna array. The at least one second cavity can be located at a position on the fifth substrate corresponding to the location of the antenna on the first substrate. Each antenna can be located in a position corresponding to the center of a given cavity of the at least one second cavity in a direction perpendicular to the plane of the antennas.

Additionally, in some examples, block 410 can include forming fluid lines in fifth substrate. The fluid lines can correspond to a respective fluid line for each one of the rows or columns of antennas located on the first layer. The fluid lines can be configured to add or remove fluid from the at least one second cavity as previously discussed.

At block 412, the method 400 includes coupling the substrates. The coupling includes coupling a bottom surface of the first substrate to a top surface of the second substrate, the bottom surface of the second substrate to a top surface of the third substrate, a bottom surface of the third substrate to a top surface of the fourth substrate, a bottom surface of the fourth layer to a top surface of the fifth substrate, and a bottom surface of the fifth substrate to a top surface of a sixth substrate. Thus, after the coupling, a multi-layer array structure, such as that shown in FIG. 1 is formed.

The coupling can be performed in various ways. In some examples, the coupling further comprises laminating the first substrate, the second substrate, the third substrate, the fourth substrate, the fifth substrate, and the sixth substrate. The lamination process can bond the layers together to form the antenna array. In other examples, different means of coupling can be used, such as using adhesives, chemical means, or other bonding processes to couple the substrates.

Figure 5:
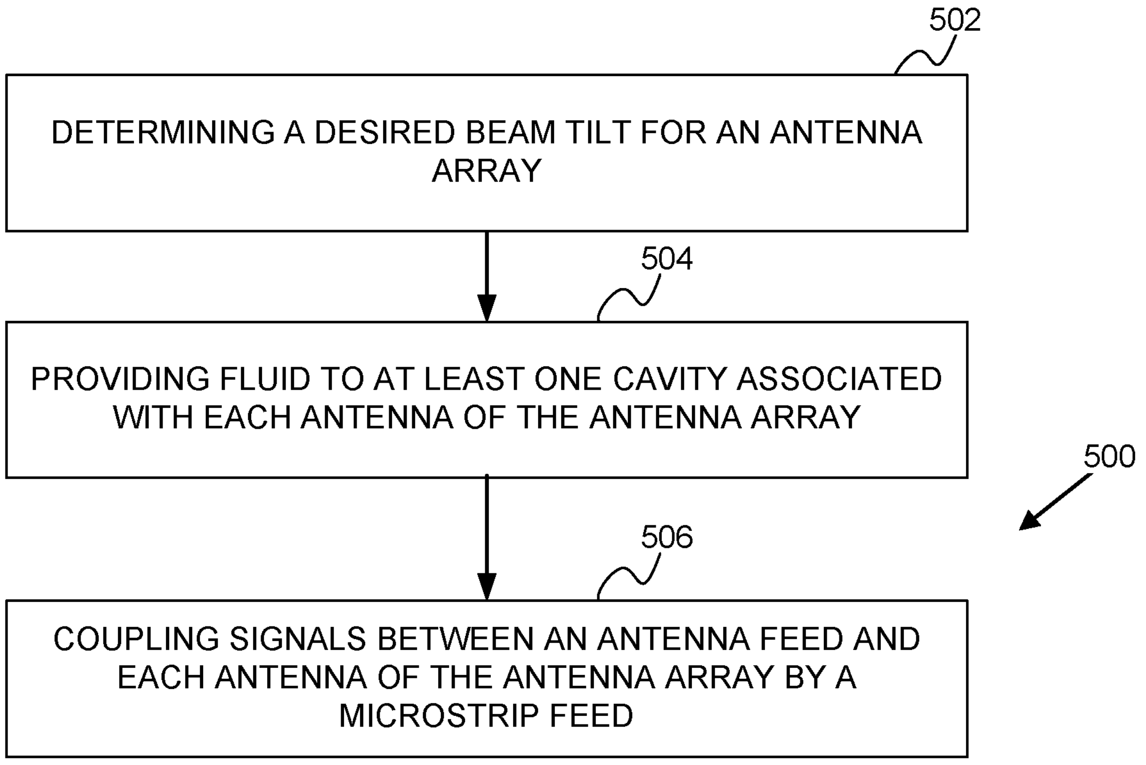
FIG. 5 is a diagrammatic representation of an example method for operating the antenna arrays disclosed herein.

FIG. 5 is a diagrammatic representation of an example method 500 for operating the antenna arrays disclosed herein. At block 502, the method 500 includes determining a desired beam tilt for an antenna array. The beam tilt can be determined by a processor of a control unit of the antenna array. In some other examples, the beam tilt can be determined by a processor configured to operate a control unit of the antenna array. The determination can be based on a predetermined beam scanning routine, such as scanning over a given region during a given period of time. In other examples, the determination can be made based on a location of a target object.

At block 504, the method 500 includes providing a fluid to at least one cavity associated with each antenna of the antenna array. Each antenna of the antenna array has a first associated cavity and a second associated cavity. The fluid can be provided to one or both of the cavities for each antenna element. The fluid is provided to cause a deflection of a ground plane located between the first cavity and the second cavity, and the deflection causes a beam tilt in a first direction for the antenna array.

The fluid provided to the cavity can be either a gas or liquid that causes a change in pressure within the cavity and therefore causes a deflection of the ground plane. In some examples, block 504 includes providing a fluid to at least one other cavity associated with each antenna of the antenna array. Thus, causing fluid to be provided to both cavities. By adding fluid to the second cavity, the fluid is provided to cause a second deflection of the ground plane.

Additionally, in some examples, block 504 can remove fluid rather than add fluid to the cavities. Adding fluid will increase the pressure within the cavity and cause an outward deflection of the ground plane, whereas removing fluid will decrease the pressure within the cavity and cause an inward deflection of the ground plane.

At block 506, the method 500 includes coupling signals between an antenna feed and each antenna of the antenna array by a microstrip feed. In various examples, block 506 can be performed before, after, or along with the performance of block 504. When the antenna is operating in a transmission mode, signals are coupled into the antenna array and the feed couples signals to each antenna element for transmission. When the antenna is operating in a reception mode, signals are received by the antennas and coupled to the feed to be communicated to a radar (or radio) processing system. Additionally, in some examples, block 506 can alternate between the transmission and reception of signals from the antenna array.

Additionally, when block 506 is operating, a direction of the beam of the antenna can be based on a phase shift of the antenna elements caused by the addition or removal of fluid from the associated cavities of each antenna. Therefore, the beam of the antenna can be pointed in a given direction by adding or removing fluid.

Figure 6:
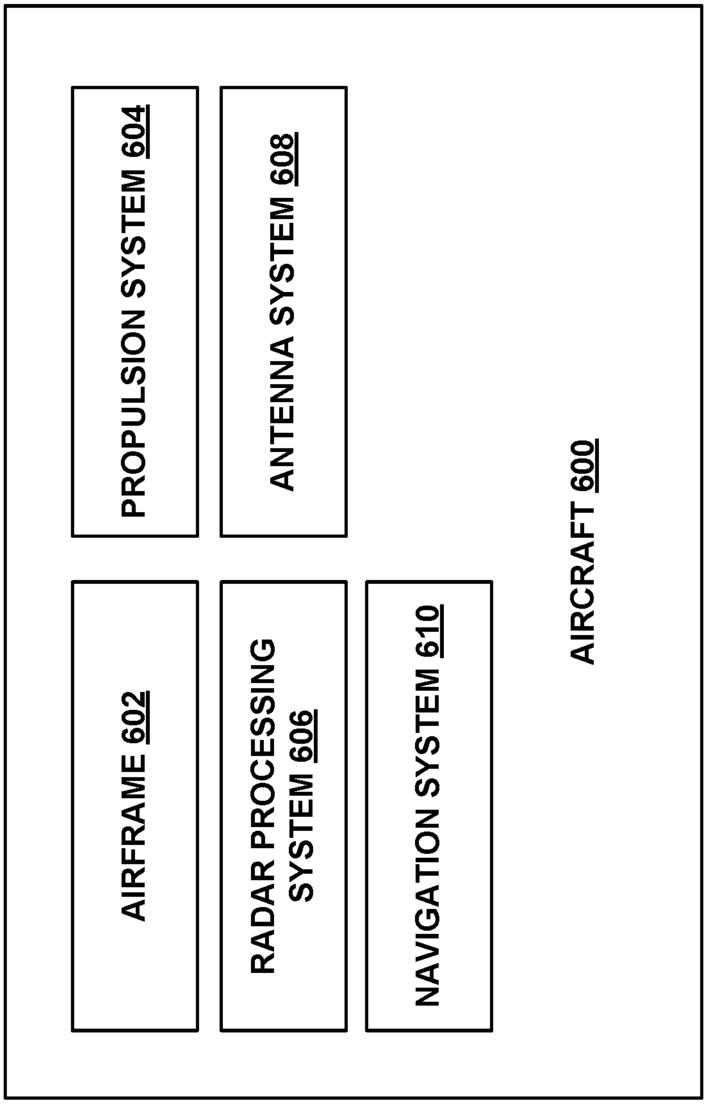
FIG. 6 is a block diagram of various systems of an aircraft.

FIG. 6 is a block diagram of various systems of an aircraft 600. The aircraft 600 includes an airframe 602, a propulsion system 604, a radar processing system 606, an antenna system 608, a navigation system 610, and other systems (not shown). The airframe 602 may be the metallic outer surface of the aircraft the associated supporting structure. The antenna system 608 includes one or more antenna arrays, like those described here, on the outside of the airframe 602.

The propulsion system 604 of the aircraft may include various different types of engines. The propulsion system 604 may include jet engines, ramjet engines, propeller engines, turboprop engines, as well as other types of aircraft propulsion as well. The propulsion system 604 functions to both provide propulsion for the aircraft, but also generate some electricity for use by various systems of the aircraft 600.

The aircraft 600 also includes a radar processing system 606. The radar processing system 606 functions to control operation of a radar system. The radar processing system 606 can create signals for transmission by the antenna system 608, process signals received by the antenna system 608, and adjust the beam steering of the antennas in the antenna system 608. The antenna system 608 includes one or more of the antenna arrays of the other figures. The antenna array(s) of the antenna system 608 control the angle of the transmitted beam based on a signal received from the radar processing system 606. In some examples, the antenna system 608 also includes a processor. The processor of the antenna system 608 functions to control the fluid pumps of the antenna array(s). The processor of the antenna system 608, in some examples, may receive a desired beam angle from the radar processing system 606 and responsively control fluid flow to produce the desired beam angle. In another example, the radar processing system 606 may directly control the fluid flow to cause the desired beam angle.

Further, the disclosure comprises examples according to the following clauses:

Clause 1. A antenna array, comprising:

an array of antenna elements disposed on a substrate, wherein the array comprises antennas aligned in rows and columns, wherein each row comprises at least two antennas and each column comprises at least one antenna;

a microstrip feed within the substrate, wherein the microstrip feed is configured to electromagnetically couple to each antenna element of the array of antenna elements;

a ground plane within the substrate;

for each antenna element and located below the respective antenna element within the substrate:

a first cavity disposed between the ground plane and feed, and a second cavity disposed on the other side of the ground plane from the first cavity;

a plurality of fluid lines, wherein there is one respective fluid line for each column and the respective fluid line is coupled to one of the first cavities and the second cavities of the column; and wherein at least one fluid line is configured to selectively add or remove fluid from the cavities coupled to the fluid line and cause a deflection of the ground plane in a region of the cavities coupled to the fluid line.

Clause 2. The antenna array of clause 1, wherein the deflection of the ground plane causes a phase shift in the antennas of the column and the phase shift causes a beam tilt of a beam transmitted by the array.

Clause 3. The antenna array of any of clauses 1 or 2, wherein the substrate comprises a plurality of layers.

Clause 4. The antenna array of any of clauses 1 through 3, wherein the substrate comprises a first layer, wherein the array of antenna elements is disposed on a first side of the first layer.

Clause 5. The antenna array of any of clauses 1 through 4, wherein the substrate comprises a second layer, wherein the feed is disposed on the second layer, and wherein the second layer is coupled to the first layer.

Clause 6. The antenna array of any of clauses 1 through 5, wherein the substrate comprises a third layer, wherein each respective first cavity is located in the third layer, and wherein the third layer is coupled to the second layer.

Clause 7. The antenna array of any of clauses 1 through 6, wherein the substrate comprises a fourth layer, wherein each respective second cavity is located in the fourth layer, and wherein a ground plane layer is coupled between the fourth layer and the third layer.

Clause 8. The antenna array of any of clauses 1 through 7, wherein the ground plane layer comprises a metallic ground plane and a ground-plane substrate.

Clause 9. The antenna array of any of clauses 1 through 8, wherein the substrate comprises a fifth layer, wherein the fifth layer provides a bottom surface for each of the respective cavities, and wherein the fifth layer is coupled to the fourth layer.

Clause 10. The antenna array of any of clauses 1 through 9, wherein each column comprises at least two antennas.

Clause 11. The antenna array of any of clauses 1 through 10, further comprising:

a second plurality of fluid lines, wherein there is one respective second fluid line for each row and the respective second fluid line is coupled to the cavities other than the cavities to which the first line is coupled;

wherein at least one second fluid line is configured to selectively add or remove fluid from the cavities coupled to the second fluid line and cause a deflection of the ground plane in a region of the cavities coupled to the second fluid line; and wherein the deflection of the ground plane causes a phase shift in the antennas of the row.

Clause 12. The antenna array of any of clauses 1 through 11, wherein the fluid is a gas or a liquid.

Clause 13. A method of manufacturing an antenna array, comprising:

disposing at least two antenna elements on a top surface of a first substrate;

disposing a microstrip feed on a bottom surface of a second substrate;

forming at least one first cavity in a third substrate;

disposing a ground plane on a bottom surface of a fourth substrate, forming a fourth layer;

forming at least one second cavity in a fifth substrate; and coupling:

a bottom surface of the first substrate to a top surface of the second substrate, the bottom surface of the second substrate to a top surface of the third substrate, a bottom surface of the third substrate to a top surface of the fourth substrate, a bottom surface of the fourth layer to a top surface of the fifth substrate, and a bottom surface of the fifth substrate to a top surface of a sixth substrate.

Clause 14. The method of clause 13, further comprising forming fluid lines in at least one of the third substrate and the fifth substrate.

Clause 15. The method of clause 13 or 14, wherein an antenna element of the at least two antenna elements has an associated first cavity and an associated second cavity.

Clause 16. The method of any of clauses 13 through 15, wherein a center of the antenna element, a center of the associated first cavity, and a center of the associated second cavity are aligned in a line perpendicular to the first surface of the first substrate.

Clause 17. The method of any of clauses 13 through 16, wherein the coupling further comprises laminating the first substrate, the second substrate, the third substrate, the fourth substrate, the fifth substrate, and the sixth substrate.

Clause 18. A method of operating an antenna array, comprising:

determining a desired beam tilt for an antenna array;

providing a fluid to at least one cavity associated with each antenna of the antenna array, wherein each antenna has a first associated cavity and a second associated cavity, and wherein:

the fluid is provided to cause a deflection of a ground plane located between the first cavity and the second cavity, and the deflection causes a beam tilt in a first direction for the antenna array; and coupling signals between an antenna feed and each antenna of the antenna array by a microstrip feed.

Clause 19. The method of clause 18, wherein providing a fluid further comprises providing a gas or providing a liquid.

Clause 20. The method of clause 18 or 19, further comprising providing a fluid to at least one other cavity associated with each antenna of the antenna array and wherein:

the fluid is provided to cause a second deflection of the ground plane, and the deflection causes a beam tilt in a first direction for the antenna array.

By the term “substantially”, “about”, and “approximately” used herein, it is meant that the recited characteristic, parameter, or value need not be achieved exactly, but that deviations or variations, including for example, tolerances, measurement error, measurement accuracy limitations and other factors known to skill in the art, can occur in amounts that do not preclude the effect the characteristic was intended to provide.

To the extent that terms “includes,” “including,” “has,” “contains,” and variants thereof are used herein, such terms are intended to be inclusive in a manner similar to the term “comprises” as an open transition word without precluding any additional or other elements.

Different examples of the system(s), device(s), and method(s) disclosed herein include a variety of components, features, and functionalities. It should be understood that the various examples of the system(s), device(s), and method(s) disclosed herein can include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments can provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing an array of antenna elements, comprising:

disposing an array of antenna elements on a top surface of a first substrate, wherein at least two antenna elements are in the array of antenna elements and wherein antenna elements of the array of antenna elements are arranged in rows and columns;

disposing a microstrip feed on a bottom surface of a second substrate;

forming at least one first cavity in a third substrate;

disposing a ground plane on a bottom surface of a fourth substrate;

forming at least one second cavity in a fifth substrate; and coupling:

a bottom surface of the first substrate to a top surface of the second substrate, the bottom surface of the second substrate to a top surface of the third substrate, a bottom surface of the third substrate to a top surface of the fourth substrate, such that the at least one first cavity is disposed between the ground plane and the microstrip feed and the at least one first cavity is located below an antenna element of the at least two antenna elements within the first substrate, the bottom surface of the fourth substrate to a top surface of the fifth substrate, and a bottom surface of the fifth substrate to a top surface of a sixth substrate, such that the at least one second cavity is disposed on the fifth substrate and located opposite the at least one first cavity; and forming a plurality of fluid lines, wherein there is one respective fluid line for each column and the respective fluid line is coupled to one of the at least one first cavity and the at least one second cavity of the column, wherein at least one fluid line is configured to selectively add or remove fluid from the one of the at least one first cavity and the at least one second cavity coupled to the at least one fluid line and cause a deflection of the ground plane in a region of the one of the at least one first cavity and the at least one second cavity coupled to the fluid line.

2. The method of claim 1, further comprising arranging antenna elements of the array of antenna elements to be in one column by four rows.

3. The method of claim 2, wherein each row comprises at least two antenna elements and each column comprises at least one antenna element.

4. The method of claim 1, wherein the microstrip feed is configured to electromagnetically couple to each antenna element of the array of antenna elements.

5. The method of claim 1, further comprising arranging antenna elements of the array of antenna elements in four columns by four rows.

6. The method of claim 1, wherein the coupling further comprises laminating the first substrate, the second substrate, the third substrate, the fourth substrate, the fifth substrate, and the sixth substrate.

7. The method of claim 1, wherein the ground plane comprises a metallic ground plane.

8. The method of claim 1, wherein forming the plurality of fluid lines comprises forming the plurality of fluid lines in at least one of the third substrate and the fifth substrate.

9. The method of claim 8, wherein the plurality of fluid lines carry a gas or a liquid.

10. The method of claim 1, wherein a center of the antenna element, a center of the at least one first cavity, and a center of the at least one second cavity are aligned in a line perpendicular to the top surface of the first substrate.

11. The method of claim 1, wherein the deflection of the ground plane causes a phase shift in the antennas of the row.

12. The method of claim 1, further comprising:

forming a second plurality of fluid lines, wherein there is one respective second fluid line for each row and the respective second fluid line is coupled to the cavities other than the cavities to which the first line is coupled.

13. The method of claim 1, wherein the deflection of the ground plane causes a phase shift in the antenna elements of the row.

14. The method of claim 13, wherein the phase shift in the antenna elements of the row causes a beam tilt of a beam transmitted by the array of antenna elements.

15. The method of claim 1, further comprising:

forming a plurality of the at least one first cavity in the third substrate, and forming a plurality of the at least one second cavity in the fifth substrate.

16. The method of claim 15, wherein each antenna element is associated with one of the plurality of the at least one first cavity and one of the plurality of the at least one second cavity.

17. The method of claim 16, wherein each antenna element is arranged in line with the associated one of the plurality of the at least one first cavity and the one of the plurality of the at least one second cavity.

18. The method of claim 16, further comprising:

coupling a plurality of pumps to the plurality of fluid lines.

19. The method of claim 16, further comprising:

coupling a plurality of switches between the plurality of pumps and the plurality of fluid lines to enable the plurality of fluid lines to selectively add or remove fluid from the one of the at least one first cavity and the at least one second cavity coupled to the at least one fluid line.

20. The method of claim 16, wherein the plurality of fluid lines carry a gas including nitrogen.

* * * * *